United States Patent [19]

Kishi et al.

[11] 4,450,545

[45] May 22, 1984

[54] VOICE RESPONSIVE DOOR LOCK SYSTEM FOR A MOTOR VEHICLE

[75] Inventors: Norimasa Kishi; Kazunori Noso; Yasuhisa Takeuchi, all of Yokosuka, Japan

[73] Assignee: Nissan Motor Co., Ltd., Yokohama City, Japan

[21] Appl. No.: 356,481

[22] Filed: Mar. 9, 1982

[30] Foreign Application Priority Data

Mar. 11, 1981 [JP] Japan .................................. 56-33999

[51] Int. Cl.³ .......................... E05B 49/00; B60Q 1/00

[52] U.S. Cl. .................................... 367/198; 307/117; 381/42; 340/52 F; 340/825.31

[58] Field of Search ......... 367/198; 340/52 F, 825.31; 381/51, 110, 42; 307/117, 10 AT

[56] References Cited

U.S. PATENT DOCUMENTS 4,389,109 6/1983 Taniguchi et al. .................. 367/198

*Primary Examiner*—Donald J. Yusko

*Attorney, Agent, or Firm*—Schwartz, Jeffery, Schwaab, Mack, Blumenthal & Koch

[57] ABSTRACT

A voice responsive door lock system is provided wherein the operation of the door lock device is vocally controlled by the driver via a voice recognition unit.

The voice responsive door lock system for a motor vehicle comprises a door position detection means, an indication means for indicating a question as to the necessity of locking the door, a voice recognition unit for identifying the driver's reply and producing a door lock command signal, and a door lock control means for actuating a door lock device upon receiving the door lock command signal.

11 Claims, 5 Drawing Figures

VOICE RESPONSIVE DOOR LOCK SYSTEM FOR A MOTOR VEHICLE

BACKGROUND OF THE INVENTION

1. Field of the Invention

The present invention relates to an automatic door lock system for a motor vehicle, and more particularly to a voice responsive door lock system which can be vocally operated by the driver via a voice recognition unit.

2. Description of the Prior Art

In prior art, various automatic door lock systems for motor vehicles have been proposed wherein the door locks are automatically actuated when the door is closed after a passenger or the driver has alighted from the vehicle and a switch has been previously set.

These systems, however, tend to suffer from the drawback that the setting of the switch by the driver may easily be neglected inadvertently and moreover gives rise the possibility that the driver may lock himself (or herself) out of the car by first setting the switch and subsequently and inadvertently forgetting to take the keys out of the ignition switch.

Therefore, an automatic door lock system wherein the setting of switches and like can be obviated and which eliminates the risk of forgetting to lock the car or locking the keys in the car.

SUMMARY OF THE INVENTION

An object of the present invention is therefore to provide an automatic door lock system in which the locking device is actuated in accordance with a vocal command by the driver (for example) which command is identified by utilizing a voice recognition unit.

According to the present invention, the voice responsive door lock system comprises a door position detection means, an indication means for indicating a question as to the necessity of locking the door, a voice recognition unit for identifying the driver's reply and producing the lock command signal, and a door lock control means for operating a door lock device.

BRIEF DESCRIPTION OF THE DRAWINGS

The feature and advantages of the arrangement of the present invention will be more clearly appreciated from the following description taken in conjunction with the accompanying drawings in which like reference numerals are used to designate corresponding elements, and in which.

DETAILED DESCRIPTION OF THE PREFERRED EMBODIMENTS

Figure 1:
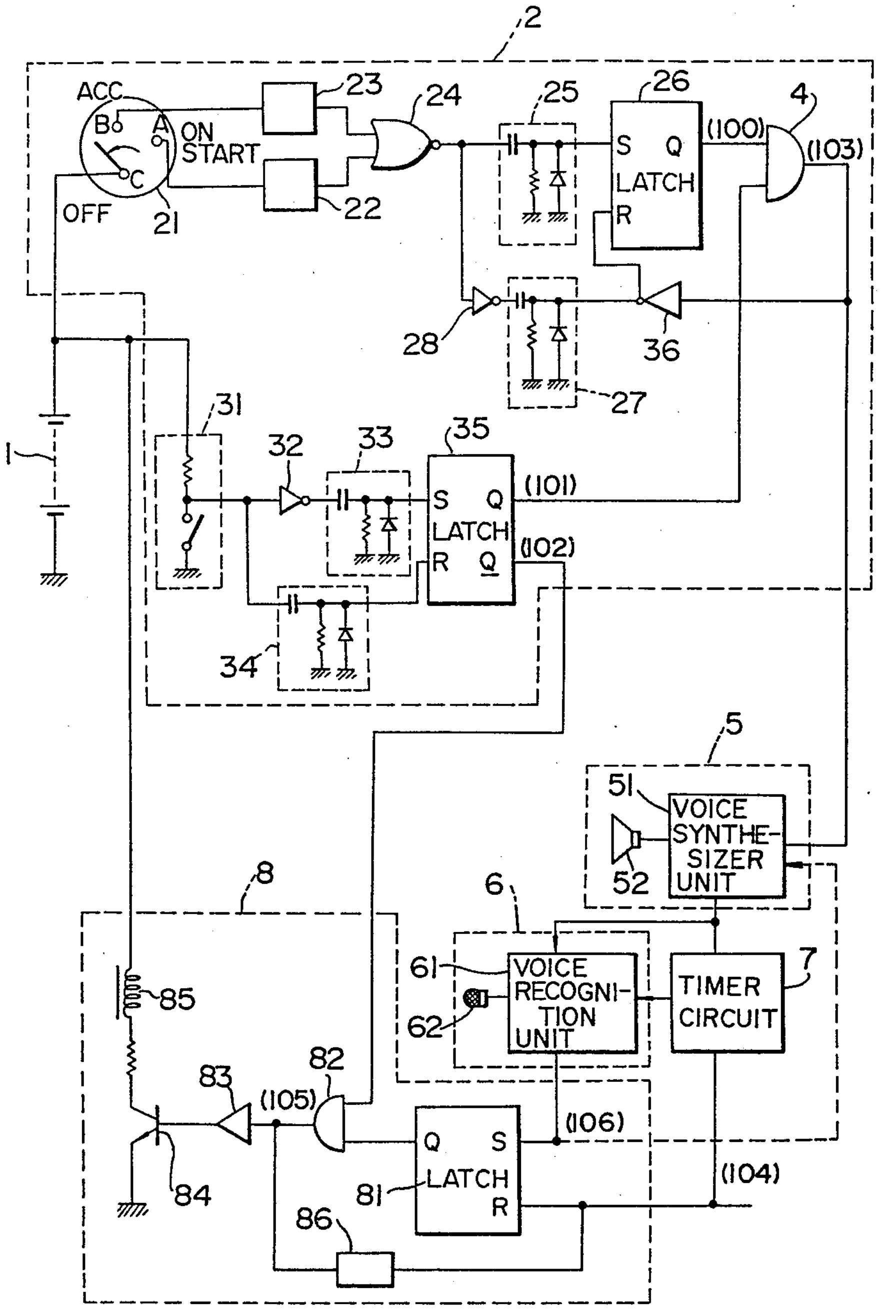
FIG. 1 is a block diagram of a preferred embodiment of the voice responsive door lock system according to the present invention.

Reference is first made to FIG. 1, in which a first embodiment of the present invention is shown, and wherein the voice responsive door lock system comprises a status detection circuit 2 which senses that the door is opened and the vehicle is at standstill, a voice synthesizer circuit 5, voice recognition circuit 6, a timer circuit 7, and a door lock control circuit 8, each respectively enclosed by dashed chain lines.

The status detection circuit 2 comprises an ignition switch position detector including regulators 22 and 23 which are connected to the "ACC" (accessory) contact and the "ON" contact of an ignition switch 21 respectively and produce a high level TTL (Transistor Transistor Logic) signal when a high level input volage is applied thereto and produces a low level TTL signal when no input signal is applied thereto, a NOR circuit 24, trigger circuits 25 and 27 which define a differentiator circuit, an inverter 28, a latch circuit 26 which takes the form of a RS flip-flop and a buffer circuit 36.

The status detection circuit 2 also comprises a door position detector including a door switch 31 which turns-on to produce a low level (approximately zero volt) output signal when the door is opened and turns off to produce a high level output signal (approximately equal to the voltage of the battery 1) when the door is closed, an inverter 32 connected to the door switch 31, trigger circuits 33 and 34 connected to the door switch 31 and the inverter 32 respectively and which define a differentiator circuit, and a latch circuit 35 which takes the form of a RS flip-flop.

The status detection circuit 2 is further provided with an AND gate 4 which receives the output signal of the ignition switch position detection circuit and the door position detector, so that a door open detection signal is produced only when the door is open and the ignition switch 21 is turned-off.

The voice synthesizer circuit 5 includes a voice synthesizer unit 51 and a speaker 52 connected thereto.

The voice recognition circuit 6 includes a microphone 62 and a voice recognition unit 61 for discriminating among preselected words registered in the memory thereof (by the driver, for example) inputted in the form of various input signals from the microphone 62.

One example of a voice recognition unit currently commercially available in Japan is marketed by the Sun Electronics Corporation under the designation of "VR 1500".

The door lock control unit 8 includes a latch circuit 81 which takes the form of a RS flip-flop, an AND gate 82, a buffer circuit 83, a relay drive transistor 84, a relay 85 for controlling the drive current of a door lock device (not shown), and a delay circuit 86.

The above disclosed circuit functions as follows:

Usually, when a driver of a motor vehicle leaves the vehicle, he (or she) firstly turns off the ignition key and then opens the door. At this time, the ignition key is turned in the counter clockwise direction to cause a movable contact C of the ignition switch 21 to move from the "ON, START" contact A, via the "ACC" (accessory) contact B to the "OFF" position in which no electrical connection is made.

So far as the movable contact C of the ignition switch 21 is turned to the "ON, START" contact A or the "ACC" contact B, the battery voltage from a battery 1 develops at the "ACC" contact A or the "ON, START" contact B respectively. Therefore, regulators 22 and 23 produce a high level TTL signal when the battery voltage is applied thereto.

Specifically, the regulator 23 produces a high level TTL signal when the movable contact C of the ignition switch 21 is switched to the "ON, START" contact and produces a low level TTL signal when the movable contact C is turned to the other positions. Similarly, the regulator 23 produces the high level TTL signal when the movable contact C is switched to the "ACC" contact A, and produces the low level TTL signal when the movable contact C is turned to the other positions.

The NOR circuit 24 which receives the output signals of regulators 22 and 23, produces the high level signal when both of two input thereof are applied with the low level signal, in the other words, the ignition switch 21 is turned to the "OFF or LOCKED" position and produces the low level signal when the high level signal is applied from at least one of the regulators 22 and 23, in the other words, the ignition switch 21 is turned to the "ON, START" position or the "ACC" position.

The trigger circuit 25 connected to this NOR circuit 24 is adapted to sence the rising edge of the output signal of the NOR circuit 24 applys the high level trigger signal to the set input of the RS flip-flop. When the output signal of the NOR circuit 24 rises from the low level to the high level, a high level trigger signal is applied to the set input S of the latch circuit 26.

With the above circuit construction, the operation of ignition switch 21 to turn from the "ON, START" position to the "OFF" position via the "ACC" position, is detected.

Once the set signal from of the trigger circuit 25 is applied at the set input thereof, the latch circuit 26 produces the high level signal at the output terminal Q thereof, i.e., on the line 100 until a reset signal is applied to the reset input R thereof.

On the other hand, the output signal of the NOR circuit 24 is also applied to the trigger circuit 27 via the inverter circuit 28. Therefore, when the output signal of the NOR circuit 24 turns from the high level to the low level, the trigger circuit 27 produces a high level trigger signal and applys the same to the reset input R of the latch circuit 26. In other words, when the movable contact C of the ignition switch 21 is returned to the "ACC" position B from the "OFF" position, the output level of the latch circuit 26 is turned to the low level, thus preventing the production of the high level output signal if the ignition switch 21 is turned to the positions other than the "OFF, LOCKED" position.

The operation of the door lock detection circuit will now be explained.

The door switch 31 turns off to produce the high level output signal when the door is closed. Therefore, the trigger circuit 33 receives the low level signal when the door is closed and receives the high level signal when the door opens. The output trigger signal of the trigger circuit 33 which develops when the door opens, is applied to a set input S of the latch circuit 35.

The output signal of the door switch 31 is also directly applied to the trigger circuit 34 which produces an output trigger signal when the door closes and applys the same to a reset input R of the latch circuit 35.

Thus, the output Q of the latch circuit 35 i.e., the line 101 is held at the high level when the door is opened and held at the low level when the door is closed.

Conversely, the output $\overline{Q}$ of the latch circuit 35, i.e., line 102 is held at the high level when the door is closed and held at the low level when the door opens.

Therefore, the signal on the lines 100 and 101 are applied to the AND gate 4 and the high level output signal (door lock signal) of the AND gate 4 represents the condition that the door is opened and the ignition switch 21 is switched to the "OFF" position at the same time.

Since it is essential to detect the entry and egress of the driver who operates the ignition key, door switch 31 is preferably disposed on the door on the driver's side.

On the other hand, in place of detecting the ignition switch position, a vehicle speed signal, which can also indicate that the vehicle is at standstill may be used to produce the door lock signal (the high level output signal of the AND gate 4).

Such a constraction of the system is favourable in case of using the system under such a condition that a passenger gets out the vehicle and the driver stays in the vehicle with the engine running. Therefore, opening and closing of all the doors of the vehicle are preferably detected in such a case.

In addition, in order to prevent the system from being operated if the door is opened more than twice, the signal on the line 103 is applied to the reset input R of the latch circuit 26 via the buffer circuit 36.

The operation of the voice synthesizer circuit 5, voice recognition circuit 6, and the door lock control circuit 8 will now be explained.

In accordance with the door lock signal which appears on the line 103, the voice synthesizer unit 51 of the voice synthesizer circuit 5 produces an audio signal corresponding to the oral question as to the necessity of locking the door. When applied with the audio signal of the voice generation unit 51, the speaker voices a question such as, "Do you wish the doors locked?". After the voicing of the question, a voice recognition start signal generated by the voice synthesizer unit 51 is applied to the voice recognition unit 61 of the voice recognition circuit 6 and to the timer circuit 7.

In place of producing an audio signal by means of the voice sythesizer unit 51, a visual display such as a light emitting diode can be used for giving the notice of the start of the voice recognition to the driver.

The voice recognition circuit 6 starts its opeation in accordance with the voice recognition start signal from the voice synthesizer unit 51.

When the driver utters the reply, the voice recognition unit 61 receives the audio output signal from the microphone 62 and discriminating predetermined registered words to make judgement whether or not the door should be locked. If the answer is YES, the voice recognition unit 61 produces the high level output signal and transmits the same into the door lock control circuit 8. The microphone 62 is preferably disposed at the center of the steering wheel or on the instrumental panel to sense the driver's voice.

The words to be registered in the voice recognition unit 61 is selected such as "Yoshi" (Janese) or "OK" for the affirmative answer, and "Dame" (Japanese: pronounced "dahmeh" in Japan) or "No" for the negative answer. In that case, the voice recognition unit 61 is preferably adapted to respond to the whole syllable of each word, or respond to the consonant sound of the specified word, such as "shi" contained in the word "Yoshi", or adapted to respond to the volwel sound of the specified word, such as "ah" contained in the word "Dame".

The timer circuit 7, upon receiving the voice recognition start signal from the voice synthesizer unit 51, produces a stop signal on lines 104 and 105 after the elaps of a predetermined time period and transmits the same to the voice recognition unit 61, and to the door lock control circuit 8 respectively. The voice recognition unit 61, upon receiving the stop signal from the timer circuit 7, inhibits the input audio signal from the microphone 62, and terminates its voice recognition operation.

If none of the words registered in the memory of the voice recognition unit are recognized within this time period, or if no reply is voiced by the driver, the voice recognition unit 61 determines that the door should not be locked. Thus, eliminating a possible undesirable operation of the system such as in the case when the driver leaves the vehicle for a very short period of time, for example.

The operation of the door lock control circuit 8 will now be explained.

In the door lock control circuit 8, the latch circuit 81 which takes the form of a RS flip-flop, produces the high level output signal at the output terminal Q thereof upon receiving the door lock signal from the voice recognition unit 61 at a set input S thereof. The AND gate 82 which receives the output signal of the latch circuit 81 and the signal on the line 102, produces a high level output signal when both of input signals are high, viz., when the door is closed and the high level output signal (which indicates that the door should be locked) is produced by the voice recognition unit 61.

The output signal of the AND gate 82 developed on the line 105 is applied to the base of the relay drive transistor 84 through the buffer amplifier 83. The relay drive transistor 84, when the high level signal is applied to the base thereof, becomes conductive to drive the relay 85 and the door lock devices disposed on all of the doors of the vehicle are actuated. In this way, when the door is closed after the affirmative answer of the driver such as "OK" is identified by the voice recognition unit 61, the door lock devices are automatically operated.

In addition, in order to reset the latch circuit 81 after the door lock operation, the signal on the line 105 is applied through the delay circuit 86 into the reset input R of the latch circuit 81. The delay circuit 86 is provided for establishing the delay time corresponding to the operational time of the relay 85, so that the door lock operation is safely performed within this time duration.

Furthermore, in order to previously let the passengers know the locking operation of the system, the system may be constructed such that the voice synthesizer unit 51 produces the audio signal that "the doors will be locked", in response to the high level output signal of the the voice recognition unit 61 on the line 106. By this provision, the door lock operation is previously recognized by the passenger of the vehicle.

Figure 3A:
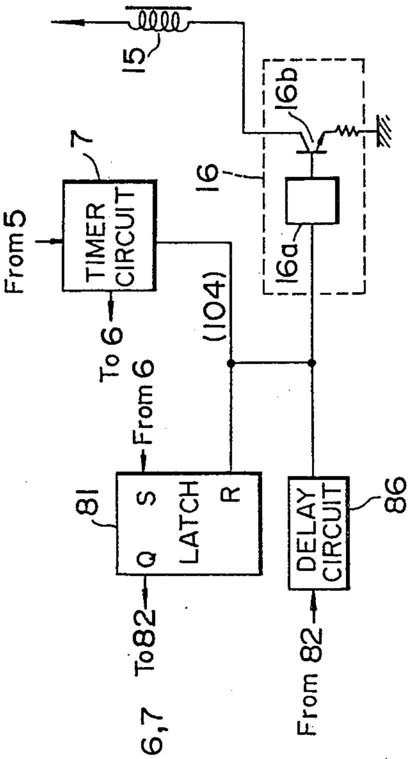
FIGS. 3A and 3B are the block diagram of a second modification of the voice responsive door lock system shown in FIG. 1.
Figure 2:
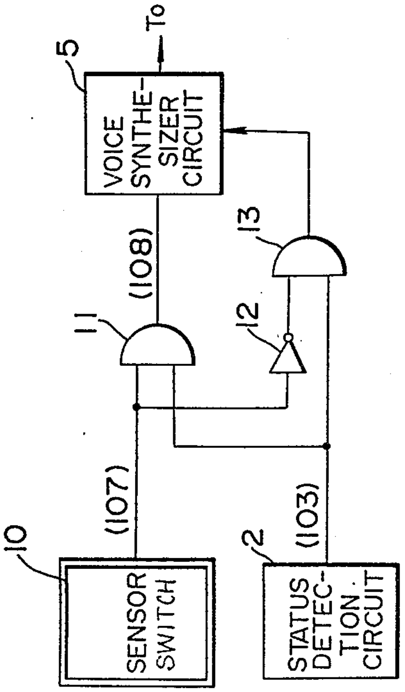
FIG. 2 is a first modification of the voice responsive door lock system shown in FIG. 1.
Figure 3B:
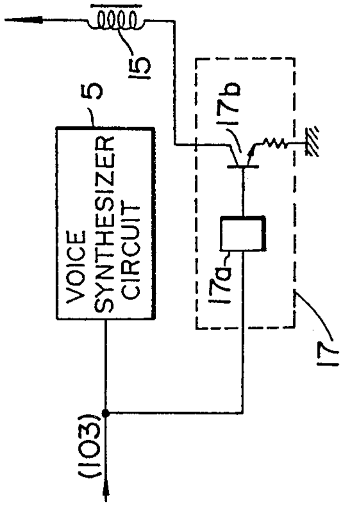
Figure 4:
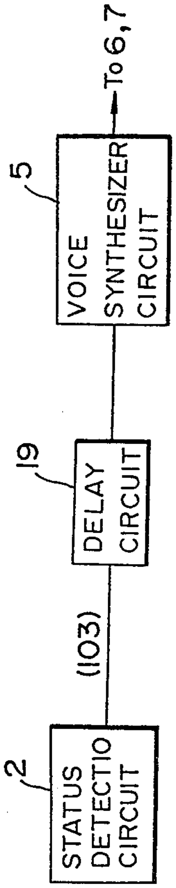
FIG. 4 is a third modification of the voice responsive door lock system shown in FIG. 1.

Reference is now made to FIGS. 2 to 4 of the accompanying drawing, in which various modification of the automatic door lock system shown in FIG. 1 are illustrated.

FIG. 2 shows a block diagram of a first modification of the present invention in which only those portions which are different from FIG. 1 are illustrated.

This modification features that the opening and closing of the windows are detected by means of a sensor 10 which produces the low level signal when all of the windows of the vehicle are closed, and produces the high level signal when at least one of the windows are opened. The output signal of this sensor switch 10 on the line 107 and the door lock signal from the status detection circuit 2 on the line 103 are applied to an AND gate 11, and the output signal of the AND gate 11 on the line 108 is applied to the voice synthesizer unit 51 which is adapted to produce the warning that "please close the window" upon receiving the signal on the line 108.

Also, in order to prevent the operation of the door lock system until the window is closed, the output signal of the sensor switch 10, through an inverter 12, and the door lock signal from the status detection circuit 2 on the line 103 are applied to an AND gate 13 whose low level output signal is used for inhibitting the operation of the voice synthesizer unit 51, viz., the voice synthesizer unit 51 is disabled when the low level signal is applied thereto. Therefore, normal questions as to whether or not the doors should be locked or not are not issued until the output level of the AND gate 13 turns high when the window is closed.

FIGS. 3A and 3B show another modification of the present invention.

This modification features the provision of an automatic power supply control circuit.

In the case of above explained embodiment, the system is constructed to be continuously supplied with the power current from the battery so that the system is operable even if the ignition switch is turned off. However, it is desirable that the electric power supply from the battery is automatically stopped when the operation of the system is not required, in order to prevent the discharge of energy of the battery when the vehicle is parked, or from a view point of the safety (for the purpose of preventing fire etc.).

An example of an automatic power shut off circuit is illustrated in FIG. 3A. As shown, a drive circuit 16 of a power current control relay 15 receives the output signal from the delay circuit 86 which indicates the termination of the energization of the door lock relay 85, and the signal on the line 104, i.e., the signal from the timer circuit 7 which inhibits the door lock operation during a predetermined time after the voice recognition is executed.

The relay 15 controls the power current of the present system, i.e., the voice synthesizer circuit 5, the voice recognition circuit 6, timer circuit 7, the door lock control unit 8. The drive circuit 16 comprises a timer circuit 16*a* which produces a square pulse signal having a sufficient duration when a high level input signal is applied thereto, and a transistor 16*b* which becomes conductive by the output signal of the timer circuit 16*a*, to energize the relay 15.

In order to automatically initiate the operation, the present system is preferably provided with an automatic power supply start system as shown in FIG. 3B. In FIG. 3B, a control circuit 17 comprises a drive circuit including a timer circuit 17*a* and a drive transistor 17*b*, and a power current control relay 15 which controls the power current of the system. The timer circuit 17*a* receives the signal on the line 103 in the case of the embodiment shown in FIG. 1 or a signal on the line 108 in the case of the modification shown in FIG. 2.

Thus, the power current control relay is energized when the voice synthesizer unit 51 receives the signal for initiating its operation.

Turning to FIG. 4, a modification of the present system is explained.

This modification features that a delay circuit 19 is provided between the voice synthesizer circuit 5 and the line 103. With this delay circuit 19, the voice synthesizer unit is prevented from operating immediately after the opening of the door. Therefore, the voicing of question is eliminated in such a case that the door is opened for a very short time, when the driver or the passenger has recognized that the door lock is only half engaged, viz., the door lock is engaged on the first stage with the door still slightly ajar.

It is needless to say that the above explained function of the system may readily performed by a microcomputer system which operates in accordance with a predetermined program sequence.

In addition, the detection of the standstill condition of the vehicle may be effected by sensing that the ignition key is taken out from the key cylinder or utilizing an output signal of a known type alarm device for the prevention of locking the key in the car.

What is claimed is:

1. A voice responsive door lock system for a motor vehicle having a door and a door lock device, comprising:

- a status detection means for producing a standstill indication signal when the vehicle is at standstill;
- a door position sensing means for producing a door open indication signal when the door is open and a door closure indication signal when the door is closed;
- a gate means for producing an indication command signal upon presence of said standstill indication signal and said door open indication signal;
- an indication means responsive to said indication command signal for indicating a question to an operator as to the necessity of locking the door upon receiving said indication command signal and producing a voice recognition start signal upon completion of indication of the question;
- a timer means responsive to said voice recognition start signal for producing a stop command signal when a predetermined time period has elapsed after receiving said voice recognition start signal;
- a voice recognition means responsive to said voice recognition start signal and said stop command signal for discriminating preselected words of the operator to determine whether or not the door should be locked, and for producing a door lock command signal upon determination of locking the door; and
- a door lock control means responsive to said door lock command signal and said door closure indication signal for actuating the door lock device upon reception of said door lock command signal and said door closure indication signal.

2. A voice responsive door lock system as claimed in claim 1, further comprising an window open detection means for producing an window open indication signal when at least one of windows of the vehicle is open, and wherein said indication means indicates the question only when the indication command signal is received upon absence of said window open indication signal.

3. A voice responsive door lock system as claimed in claim 1, further comprising a delay means for retarding the transmission of said indication command signal.

4. A voice responsive door lock system as claimed in claim 1, further comprising a power current control means responsive to said stop command signal for shutting off a power current of said indication means, said timer means, said voice recognition means, and said door lock control means, upon receiving of said stop command signal.

5. A voice responsive door lock system as claimed in claim 1, further comprising a power current control means responsive to said indication command signal for supplying a power current of said indication means, said timer means, said voice recognition means, and said door lock control means after receiving of said indication command signal.

6. A voice responsive door lock system as claimed in claim 1, wherein said indication means comprises a voice synthesizer for voicing said question.

7. A voice responsive door lock system as claimed in claim 1, wherein said status detection means comprises a vehicle speed sensor for sensing the speed of the vehicle to produce said standstill indication signal when the speed of the vehicle is reduced to zero.

8. A voice responsive door lock system as claimed in claim 1, wherein said status detection means comprises an ignition switch position sensor for producing said standstill indication signal when an ignition switch of the vehicle is switched to an off position.

9. A voice responsive door lock system as claimed in claim 8, wherein said ignition switch position sensor comprises:

- a NOR gate having inoputs and an output, said inputs connected to an ON, START contact and an ACCESSORY contact of said ignition switch respecitively, and said NOR gate producing a high level output signal at said output when said ignition switch is switched to an off position;
- an inverter connected to said NOR gate;
- a first trigger signal generator connected to said NOR gate for producing a first trigger signal at an output thereof when the high level output signal is produced at the output of said NOR gate;
- a second trigger signal generator connected to said inverter for producing a second trigger signal at an output thereof when a high level output signal is produced at the output of said inverter; and
- a set-reset flip-flop having a set input and a reset input, said set input being connected to the output of said first trigger signal generator, said reset input being connected to the output of said second trigger signal generator, said set-reset flip-flop producing said standstill indication signal after receiving a first trigger signal at said set input until said second trigger signal is inputted at said reset input.

10. A voice responsive door lock system as claimed in claim 1, wherein said door position sensing means comprising:

- a sensing switch for producing a high level output signal when the door is open;
- an inverter connected to said sensing switch;
- a first trigger signal generator connected to said inverter for producing a first trigger signal when a high level output signal is produced by said inverter;
- a second trigger signal generator connected to said sensing switch for producing a second trigger signal when the high level output signal is produced by said sensing switch; and
- a set-reset flip-flop having a set input and a reset input, said set input being connected to said first trigger signal generator and said reset input being connected to said second trigger signal generator, said set-reset flip-flop producing said door open indication signal after receiving said first trigger signal at said set input until said second trigger signal is inputted to said reset input, and producing said door closure indication signal after receiving said second trigger signal at said reset input until said first trigger signal is inputted to said set input.

11. A voice responsive door lock system as claimed in claim 1, wherein said door lock control means comprises:

a set-reset flip-flop haing set input and reset input, said set input receiving said door lock command signal and said reset input receiving said stop command signal, said set-reset flip-flop producing a high level output signal after receiving said door lock command signal at said set input thereof until said stop command signal is inputted to said reset input;

an AND gate having inputs and output, said input receiving said door closure indiation signal and said output signal of set-reset flip-flop respectively, said AND gate producing a high level output signal upon presence of said door closure indication signal and the output signal of said set-reset flip-flop; and a switching transistor connected to said output of AND gate, said switching transistor turning conductive to supply a power current of the door lock device upon receiving the high level output signal of said AND gate.

* * * * *